United States Patent [19]

Denny et al.

[11] Patent Number: 5,469,627
[45] Date of Patent: Nov. 28, 1995

[54] APPARATUS FOR FITTING A GOLF CLUB TO A PLAYER

[75] Inventors: Bradley J. Denny, San Marcos; Richard H. Hannon, Oceanside, both of Calif.

[73] Assignee: Plop Golf Company, Carlsbad, Calif.

[21] Appl. No.: 353,725

[22] Filed: Dec. 12, 1994

[51] Int. Cl.⁶ .................................................. G01B 7/00
[52] U.S. Cl. ................................................ 33/508
[58] Field of Search .......................... 33/508, 784, 706, 33/806; 273/183.1, 187 R, 32, 80.1, 80 D

[56] References Cited

U.S. PATENT DOCUMENTS

| | | | |
|---|---|---|---|
| 3,953,033 | 4/1976 | Kelly et al. | 33/508 X |
| 4,104,802 | 8/1978 | Johnston | 33/508 |
| 4,788,774 | 12/1988 | Boone | 33/508 |
| 4,885,847 | 12/1989 | Korfanta | 33/508 |

OTHER PUBLICATIONS

"Gage Helps Golfer Fit Clubs to His Stance", *Popular Science Monthly*, Jan. 1933, p. 53.

*Primary Examiner*—Alvin Wirthlin
*Attorney, Agent, or Firm*—John R. Duncan; Frank D. Gilliam

[57] ABSTRACT

An apparatus for fitting golf club length and head-to-shaft angle to an individual person. The fitting club shaft is in two telescoping portions. A conventional grip is provided at the end of the first portion and the end of the second portion is pivotally connected to a conventional club head. A generally "L" shaped electrically insulating panel has one leg extending into the second shaft portion and the other leg extending into a cavity in the head. A first series of longitudinally spaced electrical contacts on the first end are adapted to be contacted by a connection contact on the movable first shaft portion to send an electrical signal indicating club length. A second series of spaced electrical contacts are radially arranged on the second leg about the shaft pivot point. The second series of contacts is adapted to be contacted by a second connection contact to send an electrical signal indicating head-to-shaft angle. A person grasps the fitting club grip and assumes a normal golf stance. A digital display provides a visible readout on an adjacent tower of the club length and head-to-shaft angle selected by the person. A rack attached to the tower carries a number of normal clubs having different lengths and angles, so that the person can select a club having dimensions corresponding to the display.

18 Claims, 4 Drawing Sheets

APPARATUS FOR FITTING A GOLF CLUB TO A PLAYER

BACKGROUND OF THE INVENTION

This invention relates in general to golf clubs and, more specifically, to an apparatus for fitting golf club length and shaft-to-head angle to a particular golfer.

A wide variety of golf club designs are available today. Different club lengths, head-to-shaft angles, grip sizes, materials and shapes, head sizes and shapes are all available.

Different golfers have different individual physical characteristics such as height, weight, arm length and have different stances when addressing a golf ball such as differences in degree of knee bend, open or closed stances, foot spacing, etc. In addition, with putters many golfers bend over the ball differently and grip the club at different locations along the club. A wide variety of golf club designs are available. In particular, a great many putter configurations have been designed.

It is very difficult for golfers to select among the various designs, different club lengths and different head-to-shaft angles available. Since club length and head angle are interrelated in that head angle to the ground is generally less for longer club lengths for a give golfer's distance between hand position and the ground, it is very difficult to select an optimum combination of club length and head angle simple by trying a few clubs of fixed length and head angle. This is particularly true of putters where a particular "feel" is necessary both for optimum performance and maximum confidence of the golfer in the putter.

Many pro shops and sporting goods stores maintain in-store putting greens, driving cages and the like where golfers can try out different club types. Video tapes may be made of a golfer's swing to aid in selecting appropriate club designs. However, with the great many different clubs available, it is very difficult for a player to try even a representative sample and accurately compare one club with another because of the interaction of the many variables.

Even with the help of a teaching professional golfer it is difficult for a golfer to chose the ideal club to fit his or her needs. This is particularly true with putters due to the large number of putter designs available and the large number of different stances used. A player is likely to choose a putter based on appearance and "feel", even though the club length and head-to-shaft angle are not ideal for his or her build, stance, style, etc.

Thus, there is a continuing need for ways of fitting golf clubs, in particular putters, to specific players.

SUMMARY OF THE INVENTION

The above-noted problems, and others, are overcome in accordance with this invention by an apparatus for fitting golf club lengths and head-to-shaft angles to an individual golfer which includes a fitting golf club-like device having a first club shaft portion and grip essentially identical to an actual first club shaft and grip, a second shaft portion slidably telescoped relative to the club shaft and a golf club head secured to a rigid base to which the second shaft portion is pivotally mounted. The player grasps the club grip and takes a normal stance, which moves the slidable shaft to a specific length and the club head to a specific angle. Electronic circuit means measures the specific shaft length and club head angle and provides a corresponding digital readout. The golfer notes those values and selects a corresponding club from a selection of clubs having varying lengths and head-to-shaft angles.

The apparatus is preferably battery powered for maximum portability. When the club grip is released, the shaft slides to the lowermost position and fully tilts under the force of gravity. The circuts within the shaft and head are open in this position, turning the system off. If desired, the circuit could include a blanking circuit for shutting the display off when the club has not been moved for a selected time period. The display readout is preferably mounted on a tower near the simulated golf club at a position easily observed while holding the club. The tower may also bear advertising messages and the like. A rack for holding a number of clubs is preferably mounted to the apparatus for convenience in selecting a club having the characteristics indicated by the readout.

While this apparatus may be used to select any club, including woods and numbered irons, it is particularly desirable for fitting putters, since many players use poorly fitting putters, having chosen them based on appearance, head configuration etc. rather that fit.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
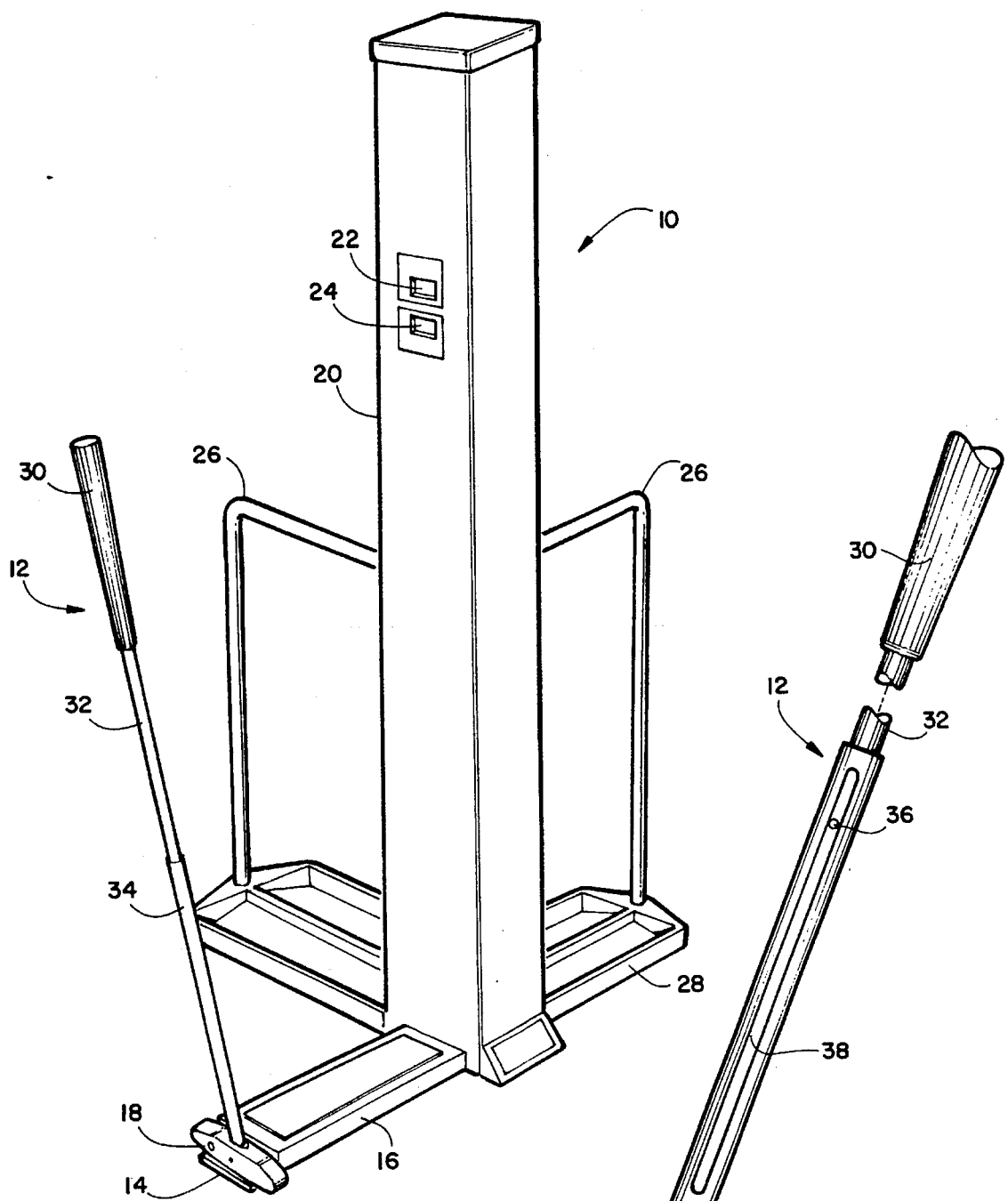
FIG. 1 is a perspective view of an assembly including the apparatus of this invention.

Referring to FIG. 1, there is seen an apparatus 10 for fitting a golf club to an individual by measuring shaft length and head-to-shaft angle of a fitting golf club 12.

The fitting club head 14 is secured to base 16, such as by a bolt 18. A tower 20 is secured to base 16 and carries two digital readouts 22 and 24 showing head lie angle and shaft length, respectively, at near eye level. The sides and top of tower 20 may bear any desired indicia or accessories, such as advertising, containers for brochures, etc.

Two racks 26 hold a number of clubs 28 having different shaft lengths and club-to-shaft angles. Sets of clubs with each of the club lengths are arranged together, with head-to-shaft angles varying within each club length group.

Figure 2A:
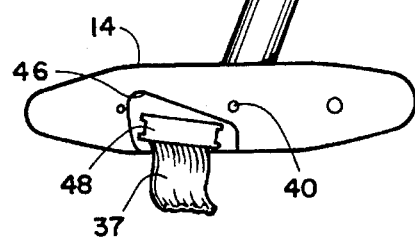
FIG. 2A is a side view of the fitting golf club showing the telescoping shaft and hinged head.
Figure 2B:
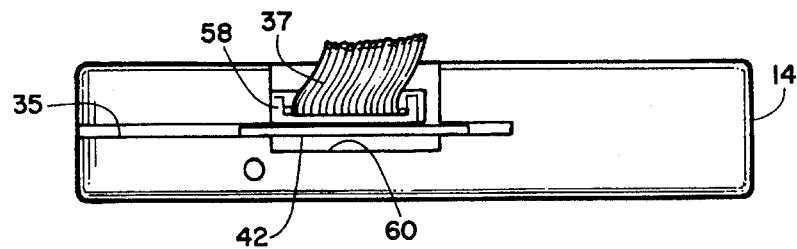
FIG. 2B is a detail view looking upwardly at the underside of the fitting club head.

Details of the construction of fitting club 12 are provided in FIGS. 1 and 2. A conventional grip 30 is provided at the end of a first shaft portion 32 which telescopes within second shaft portion 34. A pin 36 on first shaft portion 32 slides in a longitudinal slot 38 (as seen in FIG. 2) in second shaft portion 34 to assure that the two portions telescope without relative rotation.

The lower end of shaft portion 34 enters an elongated opening (not seen) in the upper surface of head 14. A pin 40 passes through the sides of head 14 and shaft portion 34. The slot in the top of head 14 is elongated along the length of head 14 to permit the shaft portions 32 and 34 and grip 30 to pivot to a selected degree relative to head 14.

Figure 3A:
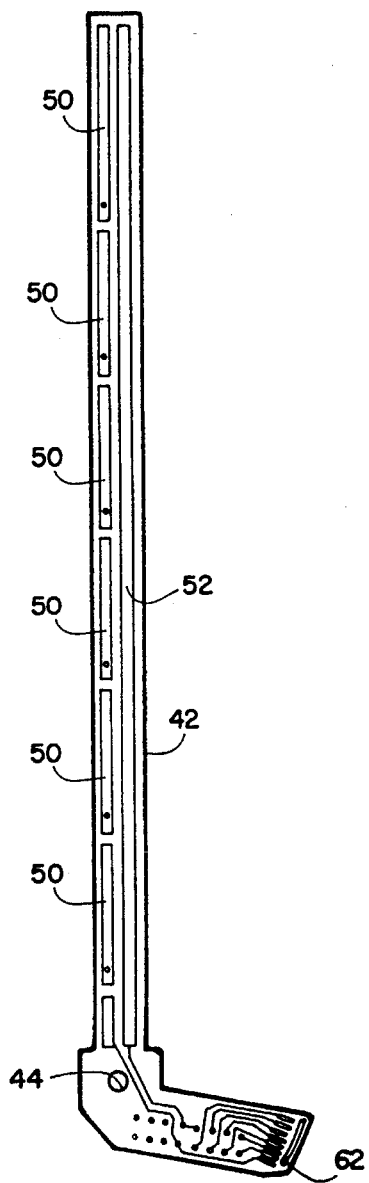
FIG. 3A is a plan view of one side of the measurement contract strip.
Figure 3B:
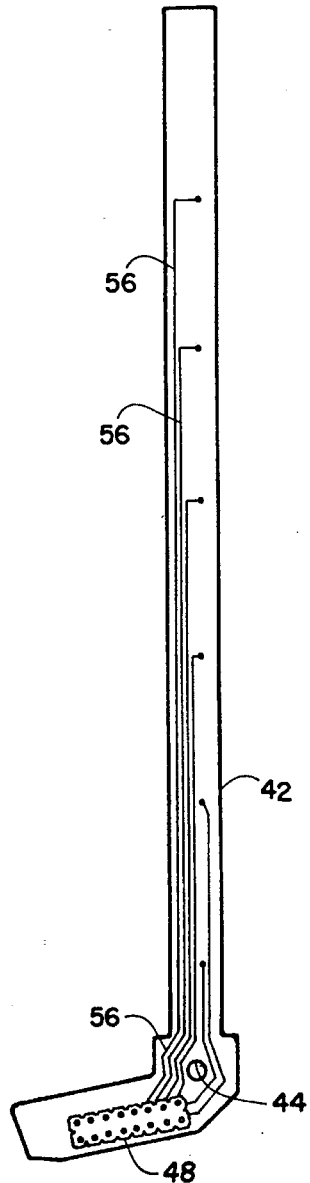
FIG. 3B is a plan view of the second side of the measurement contact strip.

An electrical contact board 42 having a roughly "L" shape as seen from opposite sides in FIGS. 3A and 3B, is positioned within shaft portion 34 and head 14, with the longer arm within the shaft. Pin 40 passes through a hole 44 in board 42 as it passes through the sides of head 14 and shaft portion 34, so that the board pivots with shaft portion 34. A slot 35 in the base of head 14 accommodates board 42. A routed cavity 46 intersects the head slot and exposes connector 48 on board 42. A conventional flexible cable 37 connects connector 48 to the measuring circuit within tower 20, as detailed below.

As seen in FIG. 3A, a series of spaced contacts 50 and a continuous contact 52 are arranged along the long leg of board 42 which extends into second shaft portion 34. A simple contact tab (not seen) within (and electrically insulated from) the end of first shaft portion 32 completes a circuit between one of spaced contacts 50 and continuous contact 52 as the first portion telescopes in and out of second shaft portion 34. The signal passes through plated holes 54 to the second side of board 42, where conductors 56 conduct a signal to the appropriate pins of connector 48. The signal passes through cable 37 to the circuit detailed below and finally to digital readout 24 which displays the shaft length at which the user is holding grip 30.

Contacts for indicating head-to-shaft angle are located on the second leg of board 42. Continuous contact 58 mounted within cavity 60 along slot 35 wipes against spaced contacts 62 which are spaced along an arc around pivot pin 36, so that each contact 58 is indicative of a particular head-to-shaft angle. A common contact strip 63 is contacted be a similar, conventional, pin mounted in the conductive head 14. The signal from the closed contacts passes to the appropriate pins of connector 48 and to the circuit described below. Ultimately, the signal is processed and passes to readout 22 which displays the head-to-shaft angle.

Figure 4A:
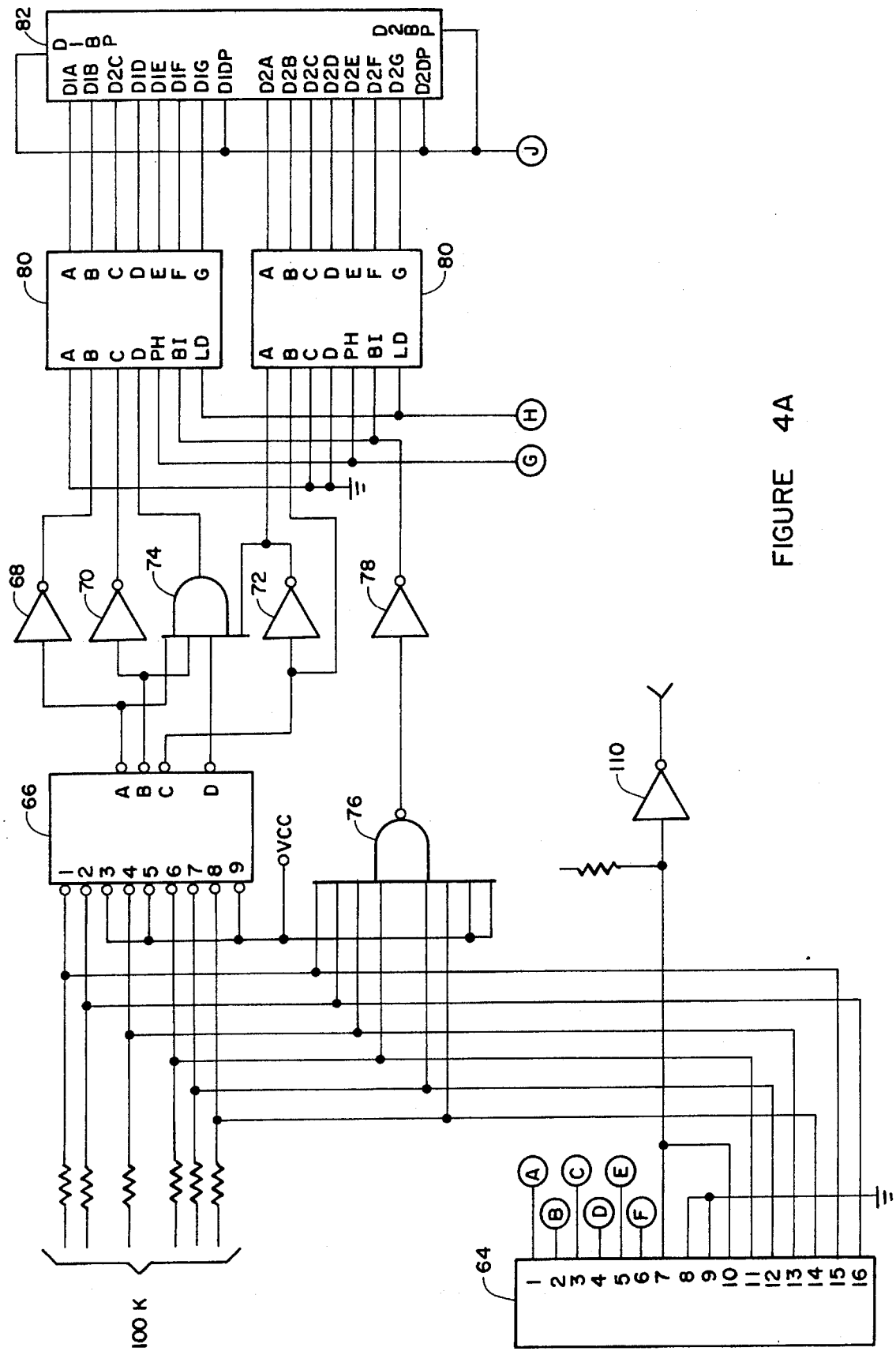
FIG. 4A is a schematic diagram of a first portion of the electronic measurement and display circuit.
Figure 4B:
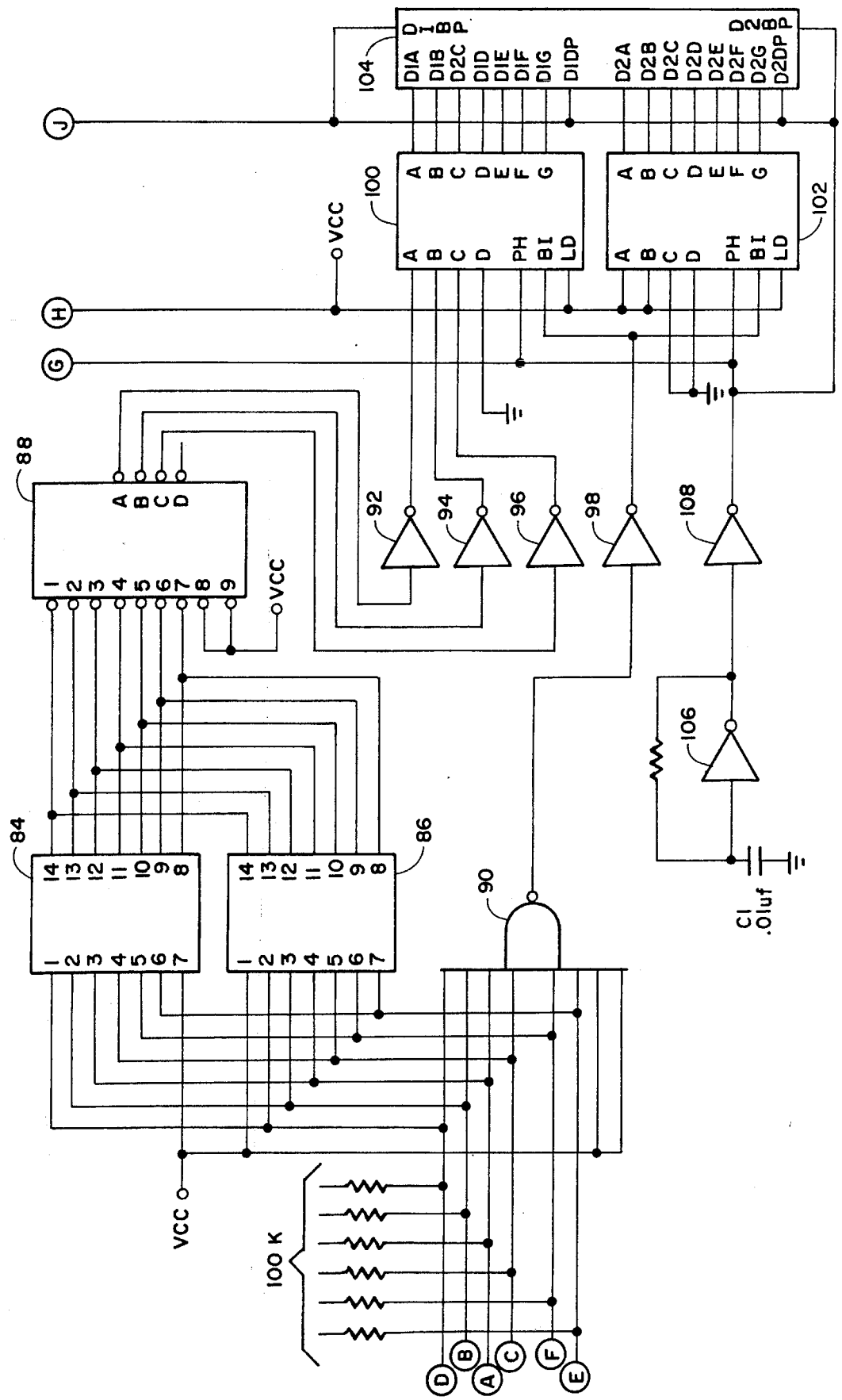
FIG. 4B is a schematic diagram of a second portion of the circuit of FIG. 4A.

The circuit which receives the signals through cable 37 from the fitting club head and produces the digital readout is shown in FIGS. 4A and 4B. Signals indicative of the length of the club shaft and the angle of the club head to the shaft when the club is held by an individual taking his or her normal stance are received at connector 64, a 16 pin male leader, via cable 37. The club length signal enters on pins 1–6 and the head angle signal enters on pins 12–24.

The head angle signals pass to priority encoder IC 66, typically a 74HC174 from Motorola which selects only one of the switch closures, indicative of a specific angle. The signal then passes to a BCD translator/shifter system, which comprises not gates 68, 70 and 72, each of which typically is a 74HC14 from Motorola then to and gate 74, typically a 4082 from Motorola, The resulting signal, together with a blanking signal from nand gate 76 (typically a 74HC30) and not gates 78 (another 74HC14) to a BCD-7 segment decoder 80, made up of two 4543 decoders from Motorola,and finally to digital display 82, typically a two-digit LCD display of the sort available from AND Corporation. The display two digits providing the head angle in degrees.

The shaft length signal passes from connector 64 to a display length selector made up of two CON14C 84 and 86 each having 14 jumper selection sites, which have a low volume dual in line resistor network installed, each typically covering a different shaft length range. The signal then passes to length priority encoder 88, typically another 74HC147. The resulting signal, together with a blanking signal from nand 90 pass to a length translator made up of not gates 92–98, then to signal decoders 100 and 102, typically each is another 4543. Finally, the signal goes to digital display 104 where two digits representing shaft length in inches are displayed. The backplane oscillator made up of not gates 106 and 108, each typically another 74HC14, is also connected to displays 82 and 104.

An individual wishing to be fitted for a golf club, in particular a putter, approaches the apparatus as seen in FIG. 1, then simply grasps grip 30 and takes a stance as if addressing a golf ball. The person will move grip 30 up or down and vary the angle of the shaft to comfortable positions. The selected shaft length will automatically be displayed on display readout 24 and the head-to-shaft angle on readout 22. The person may then select a club having corresponding length and head-to-shaft angle from the array of clubs 28 on racks 26.

While certain preferred materials, dimensions and arrangements have been described in detail in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

I claim:

1. Apparatus for fitting the length of a golf club and the club head-to-shaft angle to an individual person, which comprises:

a fitting club having the overall configuration of a standard golf club with a shaft, grip and head;

said shaft including a first portion carrying said grip and a second portion connected to said head;

said first and second shaft portions relatively telescoping to vary the shaft length from grip to head;

said head mounted for pivoting about a pivot point at the connection of said shaft and head to vary the head-to-shaft angle;

means for determining the shaft length when said grip is held with the shaft telescoped to a selected length which comprises;

a generally "L" shaped electrically insulating panel;

a first leg of said panel extending into said second shaft portion and pivotable therewith;

a first series of spaced electrical contact areas along said first leg each representing a specific shaft length;

a first continuous electrical contact means along said first leg adjacent to said first series of spaced contacts;

a first movable connection contact secured to said second shaft portion for movement along said first series of contacts and said first continuous contact to connect therebetween;

electrical circuit means for generating a digital display corresponding to the one of said first spaced contacts engaged by said first movable connection contact to indicate the overall shaft length;

means for determining the head-to-shaft angle when said grip is held with said shaft at a selected angle to said head;

first display means for displaying indicia indicating the shaft length when said grip is held at a selected length and angular position;

second display means for displaying indicia indicating the head-to-shaft angle when said grip is held at a selected length and angular position;

whereby a person may hold the grip and assume a normal golf stance and said display means will display the actual shaft length and head-to-shaft angle so that the person can select a corresponding normal club.

2. The apparatus according to claim 1 wherein said first series of spaced electrical contacts and said first continuous electrical contact is electrically insulated from said shaft and head.

3. The apparatus according to claim 1 further including a longitudinal slot in said first shaft portion and a cooperating pin mounted on said second shaft portion extending into said slot whereby relative rotation of said shaft portions is prevented and relative telescoping of said shaft portions is limited.

4. The apparatus according to claim 1 wherein said head is secured to a base and further including a tower mounted on said base with digital display means providing shaft length and head-to-shaft readout at a position visible to a person grasping said grip.

5. The apparatus according to claim 1 further including at least one rack attached to a base for holding a plurality of clubs having different lengths and head-to-shaft angles so that a person can immediately select a club corresponding to the readout resulting from that person using said fitting club.

6. The apparatus according to claim 1 wherein said fitting club has the overall configuration of a commercially available putter.

7. Apparatus for fitting the length of a golf club and the club head-to-shaft angle to an individual person, which comprises:

a fitting club having the overall configuration of a standard golf club with a shaft, grip and head;

said shaft including a first portion carrying said grip and a second portion connected to said head;

said first and second shaft portions relatively telescoping to vary the shaft length from grip to head;

said head mounted for pivoting about a pivot point at the connection of said said shaft and head to vary the head-to-shaft angle;

means for determining the shaft length when said grip is held with the shaft telescoped to a selected length which comprises:

a generally "L" shaped electrically insulating panel;

a first leg of said panel extending into said second shaft portion and pivotable therewith;

a first series of spaced electrical contact areas along said first leg each representing a specific shaft length;

a first continuous electrical contact means along said first leg adjacent to said first series of spaced contacts;

a first movable connection contact secured to said second shaft portion for movement along said first series of contacts and said first continuous contact to connect therebetween;

electrical circuit means for generating an electrical signal corresponding to the one of said first spaced contacts engaged by said first movable connection contact to indicate the overall shaft length;

means for determining the head-to-shaft angle when said grip held is with said shaft at a selected angle to said head which comprises:

the second leg of said generally L-shaped panel extending into a cavity in said head;

a second series of spaced electrical contact areas arranged radially about the head pivot point;

a second continuous electrical contact means adjacent to said second series of contact areas;

a second connection contact secured to said head for connection between said second continuous contact and one of said second series of spaced contacts as said shaft is pivoted relative to said head; and electrical circuit means for generating an electrical signal corresponding to the one of said second spaced contacts engaged by said second movable connection contact to indicate head-to-shaft angle;

first display means for displaying indicia indicating the shaft length when said grip is held at a selected length and angular position;

second display means for displaying indicia indicating the head-to-shaft angle when said grip is held at said selected length and angular position;

whereby a person may hold the grip and assume a normal golf stance and said display means will display the actual shaft length and head-to-shaft angle so that the person can select a corresponding normal club.

8. The apparatus according to claim 7 wherein said first and second series of spaced electrical contacts and said first and second continuous electrical contacts are electrically insulated from said shaft and head and said second connection contact is a pin means mounted in said head, which is electrically conductive.

9. The apparatus according to claim 7 further including a longitudinal slot in said first shaft portion and a cooperating pin mounted on said second shaft portion extending into said slot whereby relative rotation of said shaft portions is prevented and relative telescoping of said shaft portions is limited.

10. The apparatus according to claim 7 wherein said head is secured to a base and further including a tower mounted on said base with digital display means providing shaft length and head-to-shaft angle readout at a position visible to a person grasping said grip.

11. The apparatus according to claim 7 further including at least one rack attached to a base for holding a plurality of clubs having different lengths and head-to-shaft angles so that a person can immediately select a club corresponding to the readout resulting from that person using said fitting club.

12. The apparatus according to claim 7 wherein said fitting club has the overall configuration of a commercially available putter.

13. Apparatus for fitting the length of a golf club and the club head-to-shaft angle to an individual person, which comprises:

a fitting club having the overall configuration of a standard golf club with a shaft, grip and head;

said shaft including a first portion carrying said grip and a second portion connected to said head;

said first and second shaft portions relatively telescoping to vary the shaft length from grip to head;

said head mounted for pivoting about a pivot point at the connection of said said shaft and head to vary the head-to-shaft angle;

means for determining the shaft length when said grip is held with the shalt telescoped to a selected length;

means for determining the head-to-shaft angle when said grip held is with said shaft at a selected angle to said head which comprises;

a generally "L" shaped electrically insulating panel;

a first leg of said panel extending into said second shaft portion and pivotable therewith;

a second leg of said panel extending into a cavity in said head;

a series of spaced electrical contact areas arranged radially about the head pivot point;

a continuous electrical contact means adjacent to said series of contact areas;

a connection contact secured to said head for connection between said continuous contact and one of said series of spaced contacts as said shaft is pivoted relative to said head;

electrical circuit means for generating a digital display corresponding to the one of said spaced contacts engaged by said connection contact to indicate head-to-shaft angle;

shaft length display means for displaying indicia indicating the shaft length when said grip is held at a selected position;

whereby a person may hold the grip and assume a normal golf stance and said display means will display the actual shaft length and head-to-shaft angle so that the person can select a corresponding normal club.

14. The apparatus according to claim 13 wherein series of spaced electrical contacts and said continuous electrical contact are electrically insulated from said shaft and head and said connection contact is a pin mounted in said head which is electrically conductive.

15. The apparatus according to claim 13 further including a longitudinal slot in said first shaft portion and a cooperating pin mounted on said second shaft portion extending into said slot whereby relative rotation of said shaft portions is prevented and relative telescoping of said shaft portions is limited.

16. The apparatus according to claim 13 wherein said head is secured to a base and further including a tower mounted on said base with digital display means providing shaft length and head-to-shaft readout at a position visible to a person grasping said grip.

17. The apparatus according to claim 13 further including at least one rack attached to a base for holding a plurality of clubs having different lengths and head-to-shaft angles so that a person can immediately select a club corresponding to the readout resulting from that person using said fitting club.

18. The apparatus according to claim 13 wherein said fitting club has the overall configuration of a commercially available putter.

* * * * *